Sept. 15, 1964   L. GOLDSTEIN ETAL   3,149,043
NUCLEAR REACTOR
Filed Dec. 26, 1962   7 Sheets-Sheet 1

Sept. 15, 1964 L. GOLDSTEIN ETAL 3,149,043
NUCLEAR REACTOR
Filed Dec. 26, 1962 7 Sheets-Sheet 3
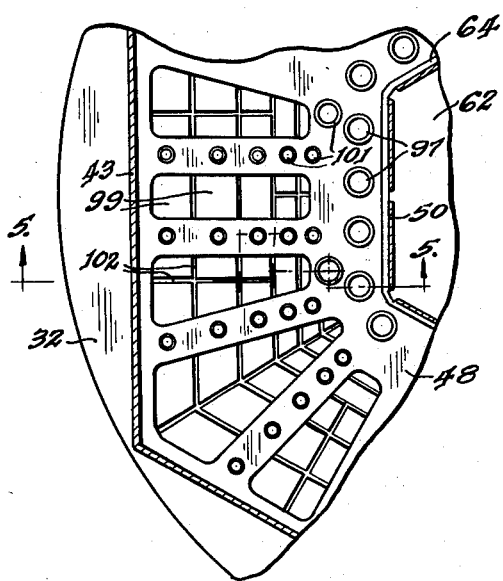
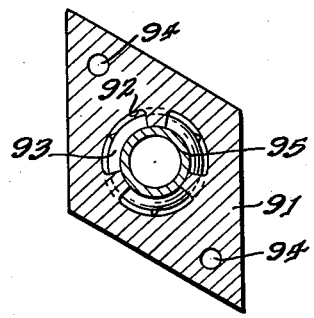
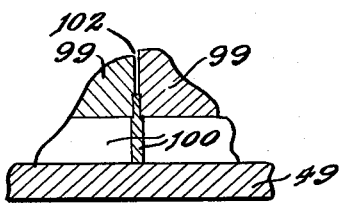
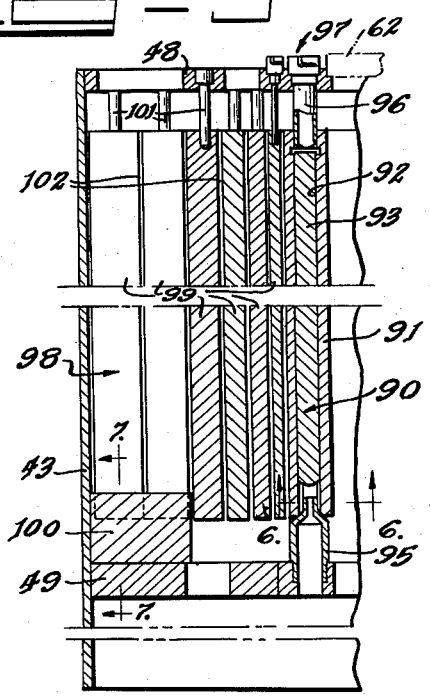
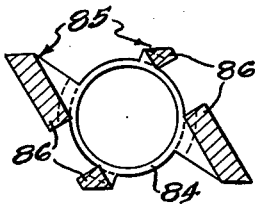

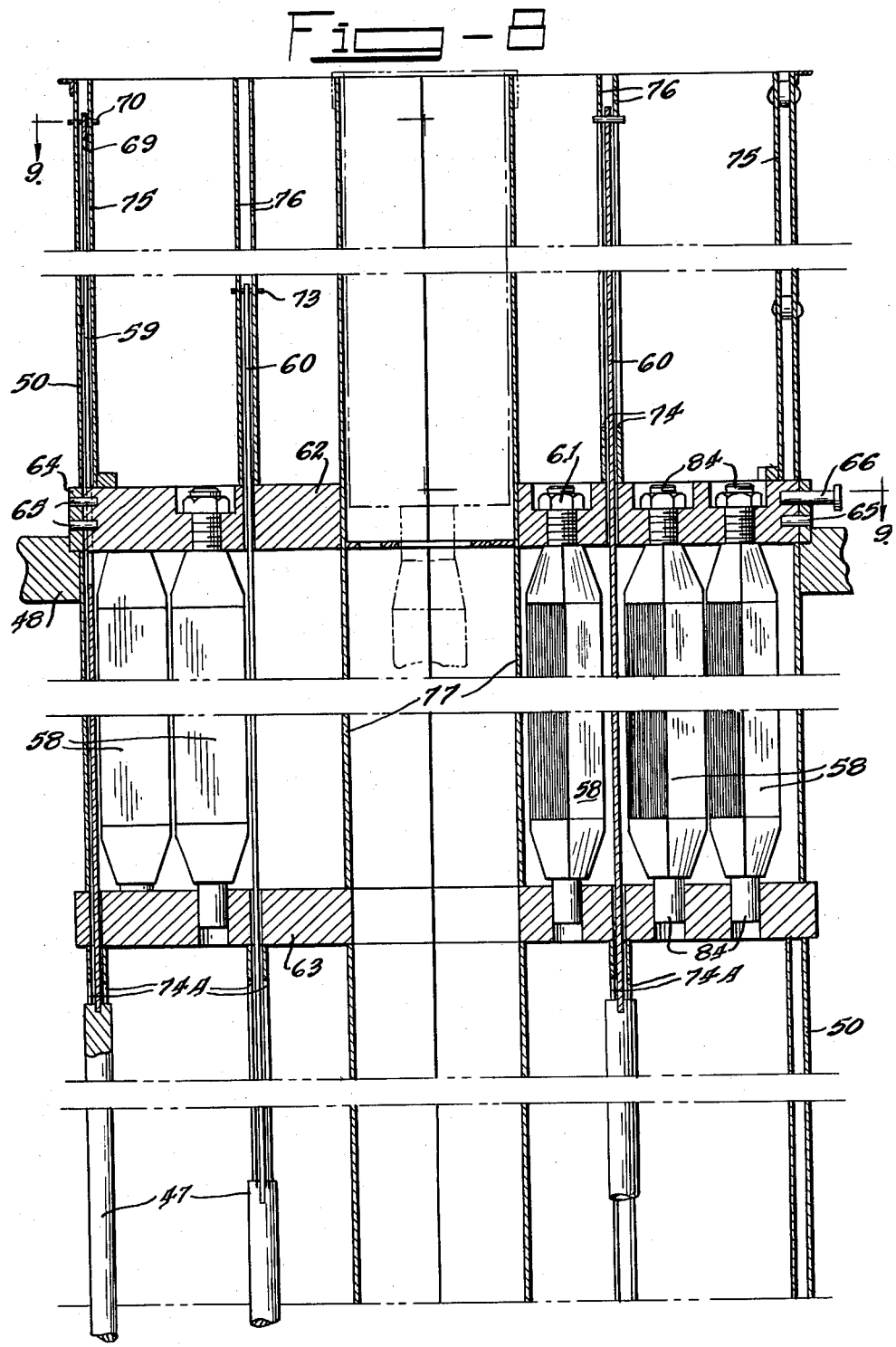

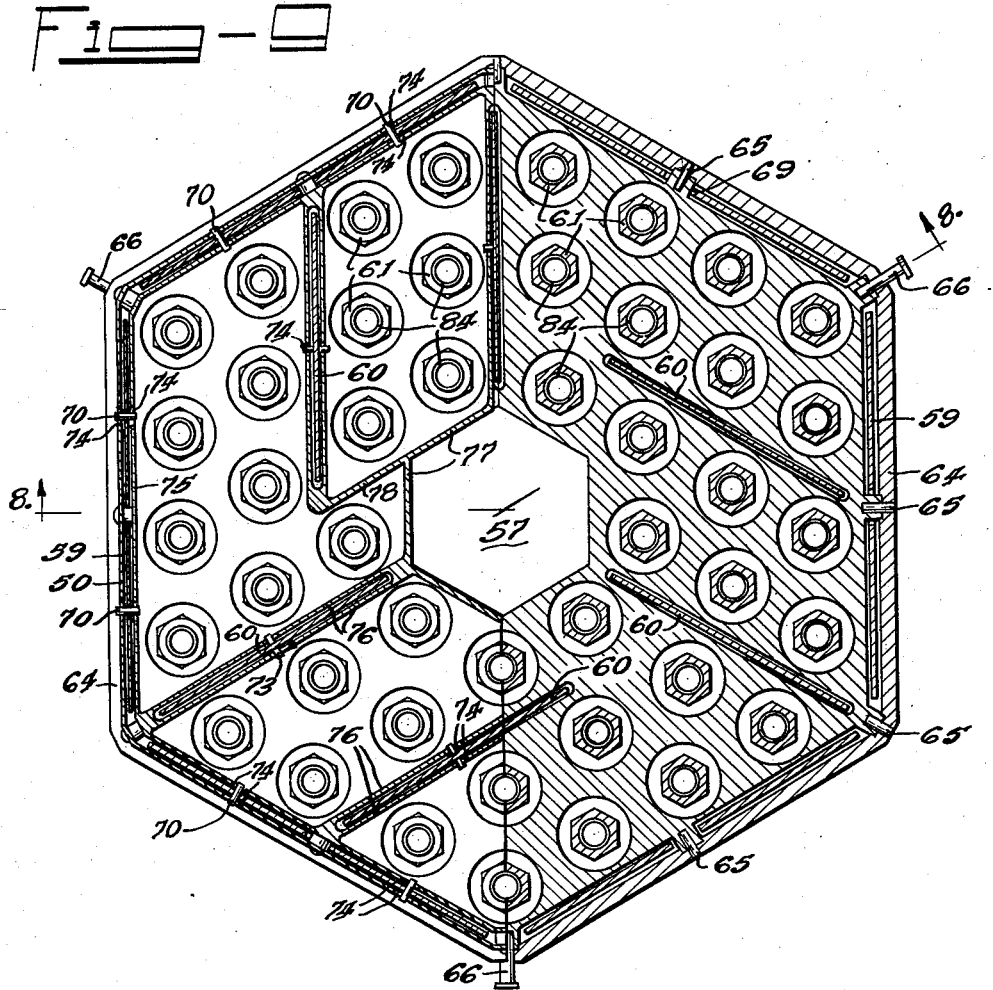

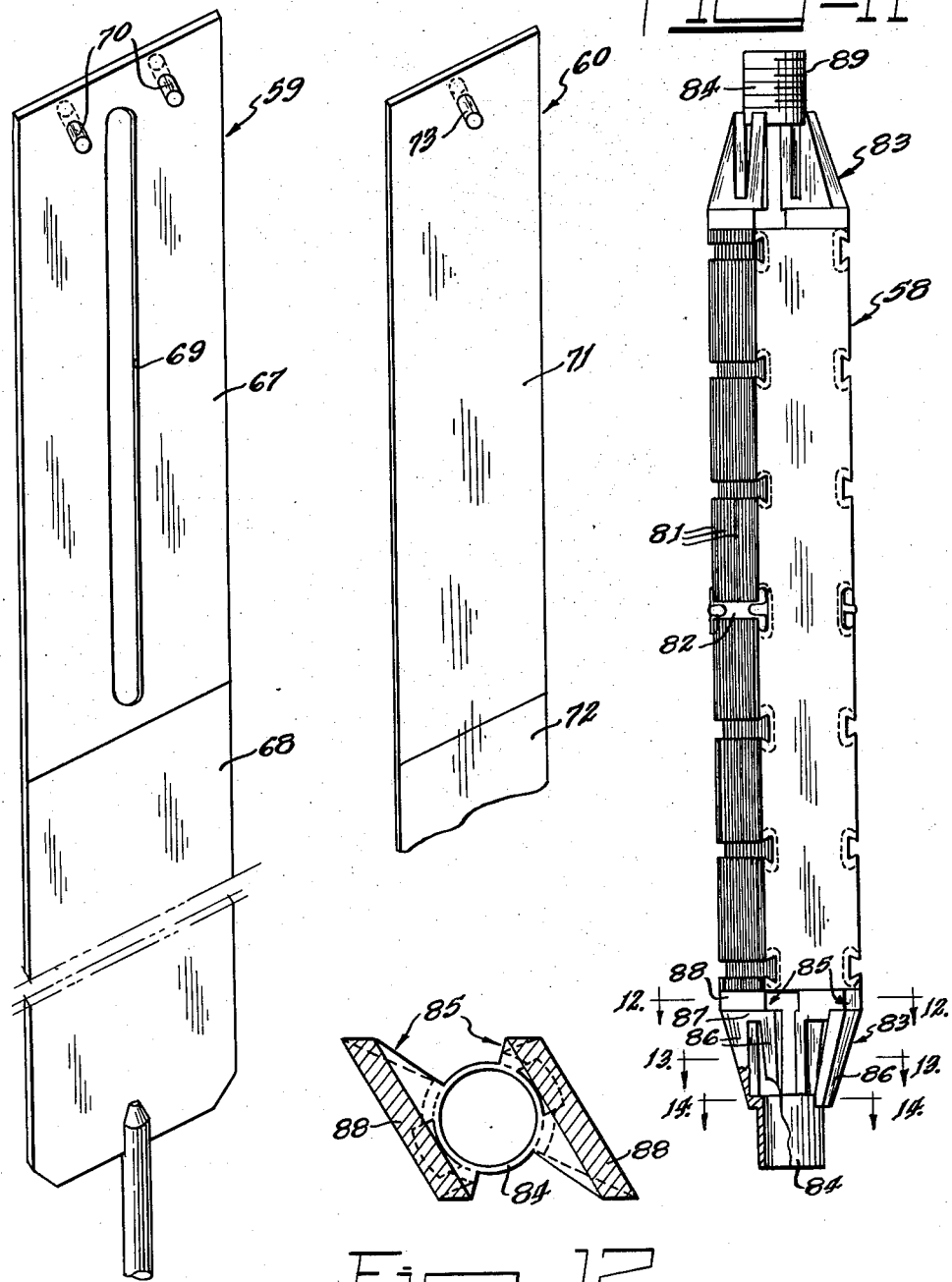

United States Patent Office 3,149,043
Patented Sept. 15, 1964

3,149,043
NUCLEAR REACTOR
Lester Goldstein, Monsey, Leon Joseph, Greenburgh, Morton S. Silberstein, Briarcliff Manor, and Albert A. Weinstein, Bronx, N.Y., assignors to the United States of America as represented by the United States Atomic Energy Commission
Filed Dec. 26, 1962, Ser. No. 247,418
6 Claims. (Cl. 176—17)

This invention relates to a very high-flux nuclear reactor designed for use in research. In more detail the invention relates to a research reactor incorporating identical plate-type fuel elements arranged in a generally annular configuration.

There is a continuing large demand for test space in high-flux nuclear reactors because maximum effect on irradiated material can be obtained in a relatively short time in such reactors. The demand for higher transuranic elements for use in research can also only be satisfied by employing very high-flux reactors to prepare such elements.

It has been shown that a maximum thermal flux can be obtained in a nuclear reactor in a flux concentration region known as a flux trap. A flux trap is a volume of moderator which is surrounded by a shell of fissionable material. The theory of the flux trap was discussed by W. K. Ergen in paper No. 628 at the Second International Conference on the Peaceful Uses of Atomic Energy which is reported in vol. 10 of the proceedings thereof at pages 181–184. Accordingly in still more detail the present invention relates to a heterogeneous, light-water-cooled and -moderated, beryllium-reflected nuclear reactor incorporating a flux trap to obtain a very high thermal flux.

Ideally a circular central flux trap is preferred as this tends to eliminate power peaking along the circumference of the interface. Large variations in local power generation are encountered when the boundary between a fueled region and flux trap is characterized by sharp corners such as are found in a square geometry. Although fuel elements have been designed which are adaptable to a circular geometry, they are expensive to fabricate and their performance characteristics are not as well known as the more conventional flat-plate box type. The problem thus is to design a reactor incorporating a core consisting of identical flat-plate fuel elements which closely approximates circular geometry.

It is thus an object of the present invention to develop a novel nuclear reactor employing identical flat-plate fuel elements which closely approximates an annular core.

It is also an object of the present invention to develop such a nuclear reactor core wherein heat peaks near the core boundaries are minimized.

These and other objects of the present invention are attained in a nuclear reactor incorporating a core shaped in cross section like a reguar hexagon with a central hole of the same shape wherein the core is made up of a plurality of fuel elements which are rhombuses in cross section. The fuel elements consist of a plurality of parallel, flat fuel plates oriented generally so as to be parallel to the boundaries of the core, the fissionable material content of the plates increasing in graduated steps from the boundaries.

The invention will next be described in connection with the accompanying drawings wherein:

FIG. 4 is a horizontal sectional view taken on the line 4—4 in FIG. 1;

FIG. 5 is a vertical sectional view taken on the line 5—5 in FIG. 4;

FIG. 6 is a partial horizontal sectional view looking upwardly in the direction of the arrows 6—6 in FIG. 5;

FIG. 7 is a detail sectional view taken on the line 7—7 in FIG. 5;

FIG. 8 is a vertical sectional view through the reactor core taken on the line 8—8 in FIG. 9;

FIG. 9 is a horizontal sectional view taken on the line 9—9 in FIG. 8;

FIG. 11 is a vertical elevation of a fuel element for the reactor;

FIG. 12 is a horizontal sectional view taken on the line 12—12 in FIG. 11;

FIG. 13 is a horizontal sectional view taken on the line 13—13 of FIG. 11;

FIG. 15 is a perspective view of a safety rod; and

FIG. 16 is a perspective view of a control rod.

Figure 1:
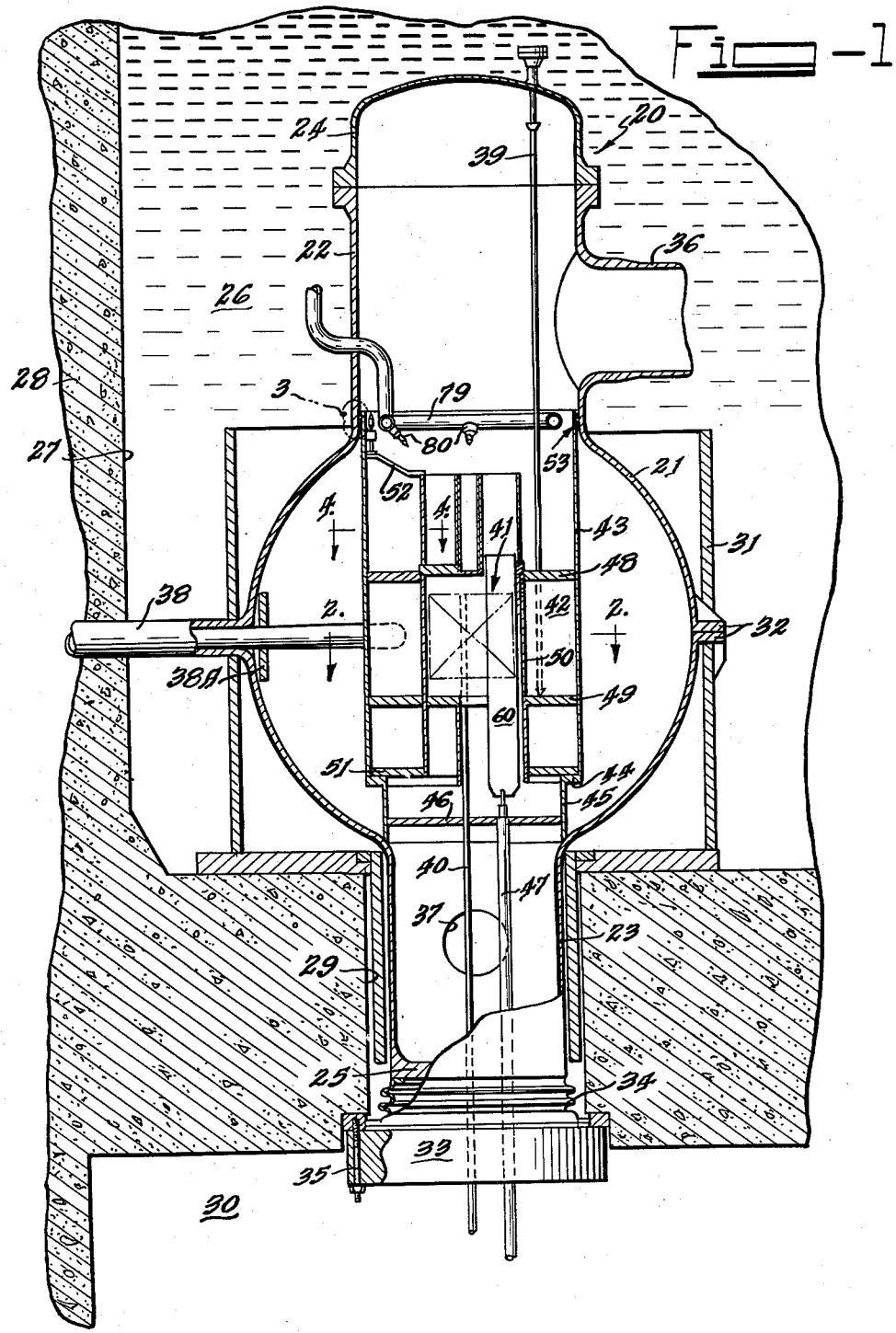
FIG. 1 is a vertical sectional view of a nuclear reactor according to our invention.

Referring now to FIG. 1 of the drawing, the reactor is provided with a stainless-steel pressure vessel 20 including an 8-foot diameter central spherical section 21, a 4-foot 4-inch diameter upper cylindrical section 22, a 3-foot diameter lower cylindrical section 23, a top head 24, and a bottom cover 25. Pressure vessel 20 is spherical at its midsection in order to provide for a water reflector-shield region around the core which serves to reduce the vessel internal heating.

The reactor is submerged in a pool of water 26 in a reactor compartment 27 located in a massive shield 28. This water serves as the biological shield above the reactor. Lower cylindrical section 23 extends into an opening 29 in the floor of reactor compartment 27 which opening communicates with a control rod drive room 30. Spherical section 21 is surrounded by thermal shield 31. Pressure vessel 20 is supported at the center of spherical section 21 by lugs 32 which rest on thermal shield 31.

A shield plug 33 connected to pressure vessel 20 by cylindrical bellows 34 is disposed in opening 29 and provides shielding below the reactor. It may be lowered by means of jack screws 35 to permit access to bottom cover 25.

In addition there is a single coolant inlet pipe 36 leading into upper cylindrical section 22 of pressure vessel 20 and two coolant outlet pipes 37 leading away from lower cylindrical section 23 as well as a plurality of horizontal beam tubes 38, protected by shields 38A, vertical sample thimbles 39, and rabbet facilities 40.

Core 41 of the nuclear reactor is disposed at the center of spherical section 21 of pressure vessel 20 and is surrounded radially by reflector 42. Hexagonal reflector shroud 43 (see also FIG. 2) surrounds reflector 42 and extends from a point adjacent the top of spherical section 21 to a point near the bottom of the spherical section. At its lowermost point reflector shroud 43 is bolted to a flange 44 which is welded to cylindrical support skirt 45 which in turn is welded to the pressure vessel at the bottom of spherical section 21.

A control rod guide plate 46 through which extend control rod drive shafts 47 is also bolted to support skirt 45. Core 41 and reflector 42 are supported and positioned by annular upper and lower support plates 48 and 49 which are welded to reflector shroud 43.

Separating the core 41 from the reflector 42 is a hexagonal core shroud 50 which is connected to the bottom of reflector shroud 43 by an annular member 51 and extends above the top of the core. Hold-down arms 52, which can be rotated to allow removal of the core, bear on the top of core shroud 50.

Figure 3:
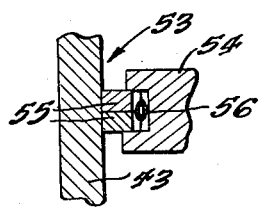
FIG. 3 is a fragmentary sectional view showing a seal used in the reactor.
Figure 14:
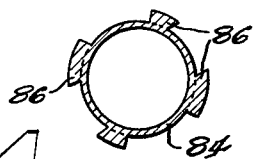
FIG. 14 is a horizontal sectional view taken on the line 14—14 of FIG. 11.

Reflector shroud 43 serves to channel the inlet water flow to the core and reflector. A seal 43 (shown in FIG. 3), consisting of a cylindrical flange 54 which is grooved to accept two split piston rings 55 and an expander 56, provides for a small leakage of cooling water between the reflector shroud 43 and the pressure vessel 20 into the spherical section 21 of the pressure vessel surrounding the reflector shroud 43 to provide a water reflector-shield region. Water also flows into this region through a series of small holes (not shown) drilled in the reflector shroud 43 just below the seal 53. This flow exists through small perforations (not shown) in the support skirt 45.

Figure 2:
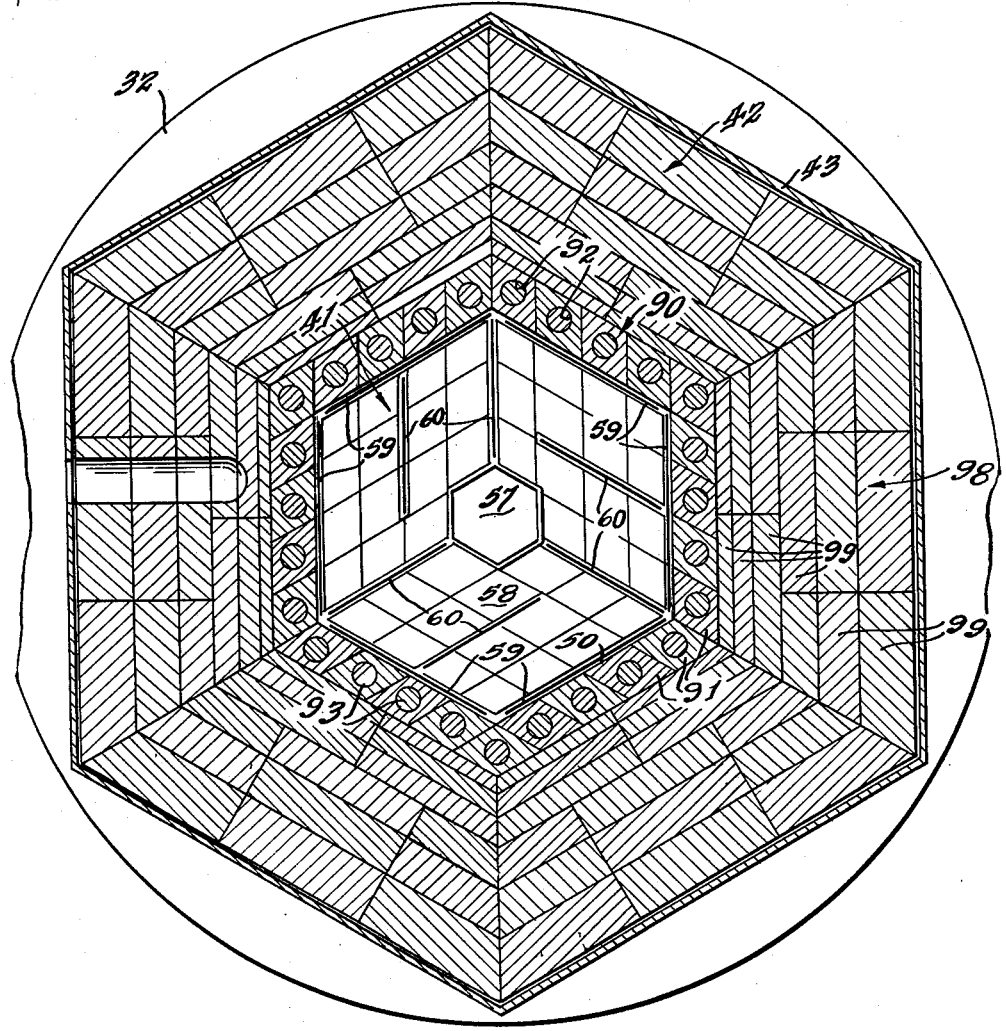
FIG. 2 is a horizontal sectional view taken on the line 2—2 in FIG. 1.

Referring now to FIG. 2, core 41 is shaped in cross section like a regular hexagon with a central hole of the same shape forming internal thermal column or flux trap 57. Core 41 is 18 inches across flats on the outside with an active height of 18 inches and flux trap 57 is 4 inches across flats. Surrounding core 41 is reflector 42 which is also shaped like a regular hexagon. Core 41 is formed of 45 elongated fuel elements 58 whose cross section is essentially a rhombus arranged in three concentric hexagonal rings around thermal column 57. Six flat-plate safety rods 59 are hexagonally disposed around the periphery of core 41 and are mounted so as to be vertically movable. Three flat-plate control rods 60 are mounted radially in the core extending between the reflector shroud 43 and the core shroud 50 and three additional offset flat-plate control rods 60 are mounted each parallel to one of the radial control rods.

This arrangement of fuel elements and control elements in the core may be described in more detail as follows: The nuclear reactor comprises the core 41 shaped in cross section like a regular hexagon with a similarly shaped central hole that is the flux trap 57. The hexagon may be visualized as formed of three imaginary incomplete 60°–120° rhombuses with their inner sides contiguous, the rhombuses being incomplete because of the absence of their three adjacent 120° corners, the hole 57 in the hexagon being formed thereby. The core is formed of 45 parallel-plate fuel elements 58 brought together in three groups of 15, each group forming one of the said imaginary incomplete rhombuses, the latter being four assemblies long on their outer sides and three assemblies long on their inner contiguous sides. There are six blade-like control rods 60 of which three lie between the imaginary incomplete rhombuses on their inner contiguous sides and are three assemblies long so as to extend from a corner of the hexagon to a corner of the hexagonal hole therein and three are located within the imaginary incomplete rhombuses, one to a rhombus, also three assemblies long, and extending into the associated imaginary incomplete rhombus between the assemblies from the middle of an outer side thereof parallel to an inner side thereof.

Referring now to FIG. 8 and 9 of the drawing, fuel elements 58 are suspended by means of nuts 61 from upper grid plate 62 and positioned in lower grid plate 63. Upper grid plate 62 is held in place on upper support plate 48 by core support ring 64 by means of pins 65. Lifting pins 66 are provided so that the entire core can be removed.

As shown in FIG. 15, safety rods 59 are nine inches wide and contain an upper poison section 67 of hafnium 0.20 inch thick and a lower follower section 68 of Zircaloy-2 also 0.20 inch thick. Safety rods 59 are provided with a central longitudinal slot 69 in the poison section 67 to accommodate pins 65. Safety rods 59 are also provided with a pair of handling pins 70 at the top thereof.

Control rods 60 are shown in FIG. 16. These control rods are 6.5 inches wide and also contain an upper poison section 71 of hafnium 0.20 inch thick and a lower follower section 72 of Zircaloy-2 also 0.20 inch thick. Each control rod 60 is provided with a handling pin 73 at the top thereof.

As shown in FIGS. 8 and 9, core shroud 50 serves as the outer shroud for the safety rods 59. Core shroud 50 contains slots 74A to receive drive shafts 47. Inner safety rod shrouds 75 extend from the upper and lower grid plates 62 and 63 to the top and bottom of the core shroud 50.

Likewise control rod shrouds 76 are provided to isolate the control blades from buffeting by the main coolant flow and extend upwardly from upper grid plate 62 and downwardly from the lower grid plate 63 to the top and bottom of the core shroud. Shrouds 76 for radial control rods 60 join inner safety rod shrouds 75 to a hexagonal lining 77 for the internal thermal column 57. Shrouds 76 for offset control rods 60 are connected to lining 77 by wings 78. Core shroud 50, safety rod shrouds 75 and shrouds 76 all contain slots 74 to receive pins 70.

As a supplement to the control obtained by safety rods 59 and control rods 60, a back-up safety device consisting of a boron injection header 79 (see FIG. 1) with four injection nozzles 80 is provided. By this means a poison material can be injected into the reactor for control in the event of an emergency.

Fuel elements 58 will next be described by referring to FIGS. 11 to 14. Each fuel element 58 comprises an assembly of 27 spaced parallel fuel plates 81 fastened together at their edges by dovetailed locking keys 82 and by end fittings 83 to form a body approximating a rhombus in cross section. Fuel elements 58 are 2.355 inches in width and have a slant height of 2.448 inches. Thus the cross-sectional shape of the fuel elements is nearly but not quite that of a rhombus. Providing space for the control rods 60 while retaining identically sized fuel elements makes this variation from a perfect rhombus necessary. End fittings 83 each comprise a hollow cylindrical member 84 which extends into the upper and lower grid plates 62 and 63, respectively, a pair of transition pieces 85 each consisting of two posts 86 which are attached to cylindrical member 84 and a connecting piece 87, and two short side plates 88 which are adapted to receive the fuel plates 81. The upper end fitting 83 has an external thread 89 on the cylindrical member 84 which receives nut 61.

Fuel plates 81 contain a uniform dispersion of highly enriched $UO_2$ particles (37 w/o maximum) in a matrix of sintered stainless steel powder and include .08 atomic percent samarium as burnable poison. A stainless steel cladding (not shown) is bonded to both sides of the fueled matrix. A summary of fuel plate dimensions follows.

| | |
|---|---|
| Geometrical cross section | Rhomboidal array of flat plates. |
| No. of fuel plates per element | 27. |
| Plate spacing, in. | 0.040. |
| Plate dimensions, in.: | |
| Thickness—clad-fuel dispersion-clad | 0.005–0.030–0.005. |
| Width— | |
| Total | 2.355. |
| Fuel dispersion | 1.968. |
| Length— | |
| Total | 20.500. |
| Fuel dispersion | 18.000. |

The remaining element of the reactor still to be described is reflector 42 which is shown in general in FIG. 2 and in detail in FIGS. 4 to 7. Reflector 42 is of beryllium and is 12 inches thick and extends two inches above and below the 18-inch active fuel height. The reflector is in the form of a right hexagonal prism, about 42 inches across flats, with a central hexagonal opening for core 41. Reflector 42 is supported at its bottom by lower support plate 49 and positioned at the top by upper support plate 48.

The inner three inches of the reflector constituting an inner reflector region 90 are in a region of high neutron flux and high heat generation. Since the beryllium in this region may be susceptible to damage, the individual pieces have been designed so that they can be easily replaced. This region constitutes a row of beryllium pieces 91 which are rhombuses in cross section to continue the pattern established by the fuel elements in the core. These pieces are penetrated by a central hole 92 which is filled with a removable beryllium plug 93. Holes 94 for cooling water are also provided. Rhombus-shaped pieces 91 are supported at the bottom on support plate 49 by a hollow cylindrical support tube 95 and at the top by a pin 96 which is held in place by an integral spring-loaded bayonet-type lock 97. This arrangement facilitates removal and replacement of these inner beryllium pieces in the event of radiation damage over a period of years. Furthermore, the shape of these replaceable pieces makes it possible to replace beryllium with standard fuel elements for special purposes.

The outer nine inches of the reflector constituting the outer reflector region 98 are penetrated by holes for beam tubes 38, vertical thimbles 39, and rabbets 40 and are consequently installed in a more permanent manner although replacement is still possible. Outer reflector region 98 contains a number of beryllium slabs 99 which become progressively thicker, from ¾ inch to 2¾ inches, in passing from the inner to the outer boundary. Slabs 99 are supported by rails 100 at the bottom and are positioned by threaded locating pins 101 at the top. Coolant flow spaces 102 between the reflector slabs 99 are 0.040 inch wide.

All structural material used in this reactor is stainless steel and stainless steel is the matrix material for the fuel. Although materials of low cross section such as aluminum were previously employed in research reactors, the design of this reactor makes it possible to employ a moderately high cross section material at a relatively low penalty in flux level and reactivity. This result follows because experimental facilities using thermal neutrons are at locations well removed from the fuel zone of the reactor.

The use of steel makes it necessary to employ a higher initial investment of fuel. This higher investment of fuel results in a much longer core life because of the higher fuel burnup per unit of available excess reactivity.

Also as a result of the stainless steel core, the reactor has an epithermal flux spectrum so that the reactor is an intermediate reactor characterized by a median fission energy of about 8 ev. Due to this, xenon and samarium buildup after shutdown is virtually eliminated making it possible to override xenon even at power densities of the order of a few megawatts per kilogram of fuel. Other advantages of importance resulting from the stainless steel core are the essential elimination of corrosion of structural material and greater structural strength and stability of the fuel plates.

It will be apparent that the major objective of the present invention has been satisfied in the reactor described hereinabove. Without losing the advantages implicit in flat-plate fuel elements of identical geometry, the advantages of a cylindrical core surrounding a central circular flux trap are obtained in essence. It is only by the described arrangement of rhombus-shaped fuel elements that a compromise between square and circular geometry having most of the advantages of both can be attained.

The other feature of importance in the present invention is the elimination of power peaks adjacent the boundaries of the core and particularly adjacent the boundary between the core and the central flux trap. This is accomplished by proper alignment of the flux plates in certain of the fuel elements with respect to the core boundaries and by reducing the amount of fuel in certain fuel plates.

Figure 10:
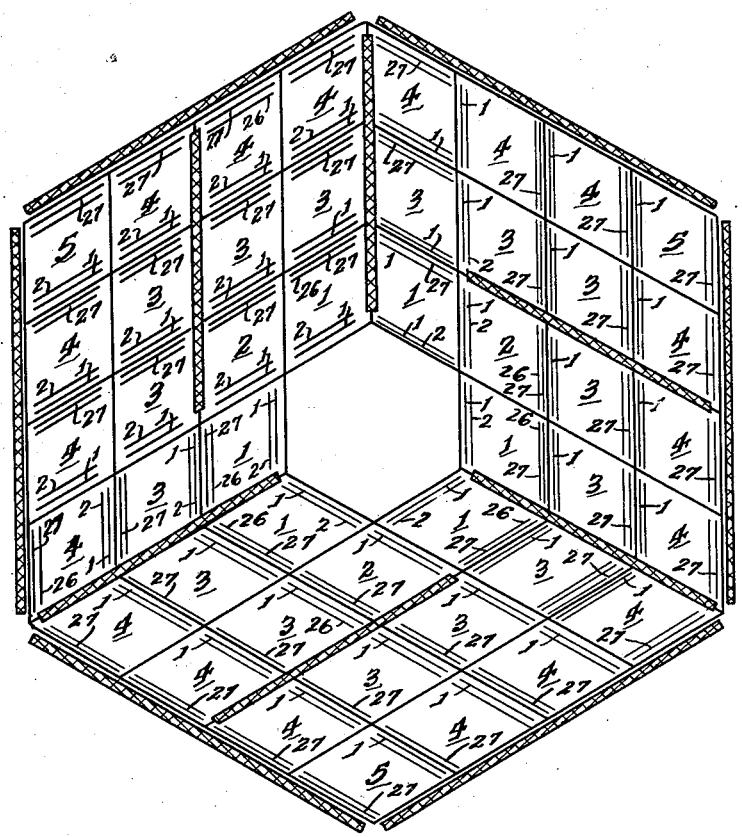
FIG. 10 is a sketch illustrating the alignment of fuel plates in the reactor core.

FIG. 10 discloses the preferred arrangement of fuel plates. As shown, the fuel plates in position No. 1, which are all adjacent to the central flux trap, are all parallel to the boundary between the core and the flux trap. The fuel plates nearest to the flux trap contain a smaller amount of fuel than do those farther from the flux trap to eliminate flux peaking near the flux trap. By this expedient the power peak at the boundary has been reduced from 8 to 9 times the core average power as in a uniformly fueled core to less than twice the average power.

From the standpoint of flux peaking alone, it would be desirable for all the fuel plates in the fuel elements adjacent to the outer boundary of the core to be parallel to the boundary. It is, of course, impossible for this to be true of the four fuel elements in position No. 5. According to the preferred embodiment of the invention the plates of six of the fuel elements in position No. 4 are not parallel to the outer boundary. The reason for this is that the slant height and width of the fuel elements are slightly different. Therefore it would be necessary to use spacer members at three corners of the reactor if all fuel elements in the No. 4 position were aligned with their plates parallel to the boundary. Rather than employ this expedient, the plates of a majority of the boundary fuel elements are aligned parallel to the boundary but the plates of six of them are not.

The following fuel plate loading is employed:

Table I

| Fuel Element Location (see Fig. 10) | Plate Number | $UO_2$ in Fuel Dispersion w/o |
|---|---|---|
| 1 | 1 | 4.59 |
|   | 2 | 5.88 |
|   | 3 | 7.62 |
|   | 4 | 9.81 |
|   | 5 | 12.8 |
|   | 6 | 16.8 |
|   | 7 | 22.1 |
|   | 8 | 28.1 |
|   | 9 | 34.6 |
|   | 10–27 | 37.0 |
| 2 | 1–27 | 37.0 |
| 3 | 1–27 | 37.0 |
| 4 | 1–22 | 37.0 |
|   | 23 | 31.8 |
|   | 24 | 31.8 |
|   | 25 | 27.8 |
|   | 26 | 20.8 |
|   | 27 | 14.5 |
| 5 | 1–27 | 37.0 |

Stainless steel flux suppressor (not shown) on the order of ½ cm. in thickness are employed adjacent to fuel elements in locations Nos. 2 and 5 to reduce flux peaking at these locations.

The following table gives some of the more important reactor parameters.

Table II

Nominal reactor power, mw. __. 100.
Coolant-moderator _____ $H_2O$.
Fuel _____ 93.5% enriched $UO_2$-SS cermet including .08 w/o samarium.
Reflector _____ Beryllium radial, $H_2O$ axial.
Fuel loading, kg. $U^{235}$ _____ 50.7.
Core volume, liters _____ 74.2.
Thermal neutron flux (unperturbed), n/cm.² sec.:
    Internal thermal column __ $3.5 \times 10^{15}$.
    Beryllium reflector _____ $7.2 \times 10^{14}$.
Coolant
    Flow rate, lb./hr. _____ $7 \times 10^6$.
    Velocity, ft./sec. _____ 40.
    Inlet temp., ° F. _____ 135.
    Outlet temp., ° F. _____ 183.
    Inlet pressure, p.s.i.a. ____ 450.

It will be understood that the invention is not to be limited to the details given herein but that it may be modified within the scope of the appended claims.

What is claimed is:

1. A nuclear reactor comprising a core having in cross section the shape of a regular hexagon with a central hole of the same shape, said core comprising a plurality of fuel elements being arranged in a plurality of hexagonal rings around the central hole and having in cross section essentially the shape of a rhombus, said fuel elements including a plurality of parallel plates, the fuel plates of most of the fuel elements located next to the boundaries of the core being parallel thereto, the fissionable material content of said plates increasing in graduated steps from the boundaries of the core to the center of the core.

2. A nuclear reactor according to claim 1 and including six flat-plate safety rods hexagonally disposed around the core and six flat-plate control rods of which three are radially disposed and three are offset and parallel each to a radial rod.

3. A nuclear reactor according to claim 2 wherein the alignment of fuel plates is that shown in FIG. 10 of the drawing and the fuel distribution is given in Table I.

4. A nuclear reactor comprising
   (1) a core shaped in cross section like a regular hexagon with a central hole of the same shape,
      the hexagon being as formed of three incomplete 60°–120° rhombuses with their inner sides contiguous, the rhombuses being incomplete because of the absence of their three adjacent 120° corners, the hole in the hexagon being formed thereby,
      the core being formed of 45 parallel-plate fuel elements brought together in three groups of 15, each group forming one of the said incomplete rhombuses, the latter being four elements long on their outer sides and three elements long on their inner contiguous sides,
   (2) six blade-like control rods,
      three of the said control rods lying between the incomplete rhombuses on their inner contiguous sides and being three elements wide so as to extend from a corner of the hexagon to a corner of the hexagonal hole therein,
      the three remaining control rods being located within the incomplete rhombuses, one to a rhombus, each of the said remaining control rods being three elements wide and extending into the associated incomplete rhombus between the elements thereof from the middle of an outer side thereof parallel to an inner side thereof.

5. A nuclear reactor according to claim 4 wherein the fuel plates of most of the fuel elements located next to the boundaries of the core are parallel thereto.

6. A nuclear reactor according to claim 5 and including a beryllium reflector surrounding the core, said reflector being divided into an inner zone consisting of a ring of beryllium elements shaped in cross section like a rhombus and containing an easily removable beryllium plug and an outer zone consisting of concentric rings of beryllium slabs increasing in thickness from the inside to the outside of the reflector.

References Cited in the file of this patent

UNITED STATES PATENTS

| | | |
|---|---|---|
| 2,982,712 | Heckman | May 2, 1961 |
| 3,029,198 | Anderson et al. | Apr. 10, 1962 |

OTHER REFERENCES

GNEC–136, A 200-Mw. (e) Boiler-Superheater Reactor Preliminary Design, Oct. 25, 1960, FIG. 4 of the illustrations.

Second International Conference on the Peaceful Uses of Atomic Energy, vol. 10, 1958, (1) Karlsruhe, page 147, and (2) Ergen, pp. 181–184.